United States Patent
Cardwell

(10) Patent No.: US 12,060,953 B2
(45) Date of Patent: Aug. 13, 2024

(54) COMPOSITE HOSE WITH RADIO FREQUENCY IDENTIFICATION (RFID) ENABLED SENSOR

(71) Applicant: Cooper-Standard Automotive, Inc., Northville, MI (US)

(72) Inventor: Brian J. Cardwell, Ypsilanti, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 379 days.

(21) Appl. No.: 17/551,094

(22) Filed: Dec. 14, 2021

(65) Prior Publication Data

US 2023/0184354 A1 Jun. 15, 2023

(51) Int. Cl.
| | |
|---|---|
| F16L 11/12 | (2006.01) |
| F16L 11/08 | (2006.01) |
| G06K 19/07 | (2006.01) |
| G06K 19/077 | (2006.01) |

(52) U.S. Cl.
CPC .......... *F16L 11/12* (2013.01); *F16L 11/082* (2013.01); *G06K 19/0723* (2013.01); *G06K 19/07722* (2013.01); *G06K 19/07728* (2013.01); *G06K 19/07747* (2013.01); *G06K 19/07758* (2013.01); *G06K 19/07786* (2013.01); *F16L 2201/30* (2013.01)

(58) Field of Classification Search
CPC ....... F16L 57/06; F16L 9/125; F16L 2201/00; F16L 11/127; G01M 3/40; G01N 27/20
USPC ........ 138/104, 36, 127, 137, 140; 73/40.5 R, 73/49.5; 324/71.1, 71.2
See application file for complete search history.

(56) References Cited

U.S. PATENT DOCUMENTS

| | | | | |
|---|---|---|---|---|
| 5,551,484 | A  * | 9/1996 | Charboneau | G01M 5/0033 138/104 |
| 7,308,911 | B2 * | 12/2007 | Wilkinson | F16L 55/00 138/104 |
| 8,754,751 | B1 * | 6/2014 | Picolli | G01S 13/751 455/562.1 |
| 8,997,792 | B2 * | 4/2015 | Betsinger | G01M 3/40 138/104 |
| 9,097,637 | B2 | 8/2015 | Pagani et al. | |
| 2007/0035383 | A1 * | 2/2007 | Roemerman | G06K 7/0008 340/505 |
| 2010/0326219 | A1 * | 12/2010 | Nelson | G09F 3/0295 24/16 R |
| 2012/0097284 | A1 * | 4/2012 | Hudson | F16L 11/124 156/247 |
| 2013/0056538 | A1 * | 3/2013 | Binmore | E21B 17/02 138/104 |

(Continued)

*Primary Examiner* — Patrick F Brinson
(74) *Attorney, Agent, or Firm* — Paschall & Associates, LLC; James C. Paschall; Anthony Miologos

(57) ABSTRACT

A system for sensing a physical property of a fluid flowing inside a composite hose includes a radio frequency identification (RFID) reader arranged to transmit radio frequency signals. An RFID tag receives the radio frequency signals and exchanges the received radio frequency to electrical energy powering the RFID tag. An included sensor electrically connected to the RFID tag receives the electrical energy from the RFID tag and powers the sensor to obtain measurement data of at least one physical property of the fluid and transmit the measurement data to the RFID tag. The RFID tag transmits the measurement data to the RFID reader using the radio frequency.

20 Claims, 3 Drawing Sheets

(56) References Cited

U.S. PATENT DOCUMENTS

| | | | |
|---|---|---|---|
| 2013/0061971 A1* | 3/2013 | Chamberland | F16L 57/06 |
| | | | 138/104 |
| 2014/0130928 A1* | 5/2014 | Drouin | F16L 55/00 |
| | | | 138/104 |
| 2017/0089496 A1* | 3/2017 | Lennon | F16L 13/146 |
| 2020/0326311 A1 | 10/2020 | McCarthy et al. | |
| 2022/0236115 A1* | 7/2022 | Tailor | H04W 4/38 |

* cited by examiner

COMPOSITE HOSE WITH RADIO FREQUENCY IDENTIFICATION (RFID) ENABLED SENSOR

TECHNICAL FIELD

This disclosure is generally directed to a composite hose having a radio frequency identification (RFID) enabled sensor. More specifically, it relates to a composite hose that uses an RFID enabled sensor to sense a physical property of a fluid flowing within the hose and to report the sensed physical property using an RFID communication protocol.

BACKGROUND

Composite hoses are flexible rubber hoses typically used in the automotive industry to transfer fluid within, for example, a heating/cooling or brake system. The composite hoses include one or more layers of EPR (ethylene-propylene copolymer rubber). EPDM (ethylene-propylene-diene terpolymer rubber), a silicone-modified polyolefin, and/or a silane-grafted polyolefin and one or more layers of textile reinforcement. Composite hose compositions exhibit good flexible bending properties, for example for bending the composite hose to a minimum bend radius without crushing or kinking the hose and also good resistance to high temperature and abrasion. It is desirable in automotive fluid handling applications to sense various aspects of the physical or chemical properties of the fluid being conveyed by a hose, the physical state of the hoses, and their connecting fittings. These properties include, but are not limited to, items such as temperature, pressure, flow rate, presence of leaks, etc. It is also desirable to monitor the physical states of the hoses for abrasion or wear that may lead to leaks or failures. Frequently, some part of the hose or its fittings is not easily accessible after installation or otherwise difficult or inconvenient to measure. Additionally, it is not always possible or convenient and economical to route power or signal wires to the location within the vehicle structure where a sensor or its associated hose is located.

Radio-frequency identification (RFID) technology has become widely used in virtually every industry, including transportation and manufacturing. A typical RFID system includes an RFID tag, and at least one RFID reader or detection system having an antenna for communication with the RFID tag, and a computing device to control the RFID reader. The RFID reader includes a transmitter that may provide energy or information to the RFID tag, and a receiver to receive identity and other information from the tag. The computing device processes the information obtained by the RFID reader. The RFID tags communicate using a pre-defined protocol, allowing the RFID reader to receive information from one or more tags. The computing device may serve as an information management system by receiving the information from the RFID reader and performing some action, such as, presenting information to a user or storing a measurement in a database.

Passive RFID tags collect energy from interrogating radio waves of nearby RFID readers. The passive RFID tag uses the collected energy to perform operations such as powering the sensor to obtain real-time measurements from the hose. The measurements are then sent as data to an external RFID reader for display, or further processing by the computing device. In this way, it is possible to provide an RFID sensor that does not require on-board power sources for operational power, such as for example a battery or other power supply and its associated electrical conductors.

It would be therefore beneficial in certain applications to have a sensor that monitors and reports physical properties of a fluid flowing in a composite hose, and which is powered by a passive RFID tag.

SUMMARY

This disclosure relates to a system that uses an RFID enabled sensor to sense a physical property of a fluid flowing within a composite hose and to report the sensed physical property using an RFID communication protocol.

In a first embodiment, a system for sensing a physical property of a fluid flowing inside a composite hose is disclosed. The systems comprises a radio frequency identification (RFID) reader arranged to transmit radio frequency signals. An RFID tag receives the radio frequency signals and converts the radio frequency to electrical energy to power the RFID tag. A sensor electrically connected to the RFID tag is located adjacent the fluid flowing in the composite hose. The sensor receives the electrical energy from the RFID tag and operates to obtain measurement data of at least one physical property of the fluid. The sensor transmits the measurement data to the RFID tag, wherein the measurement data is transmitted from the RFID tag to the RFID reader using the radio frequency.

In a second embodiment a method for sensing a physical property of a fluid flowing inside a composite hose is disclosed. The method comprising transmitting signals in a radio frequency using an RFID protocol, to an RFID tag. The RFID tag receiving the radio frequency and the RFID protocol. The method further includes converting by the RFID tag the radio frequency to electrical energy to power the RFID tag and a sensor located adjacent the fluid flowing inside the composite hose. The method also including operating the sensor using the electrical energy to obtain measurement data of at least one physical property of the fluid and transmitting the measurement data to the RFID tag, wherein the measurement data is transmitted from by the RFID tag using the RFID protocol and the radio frequency.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
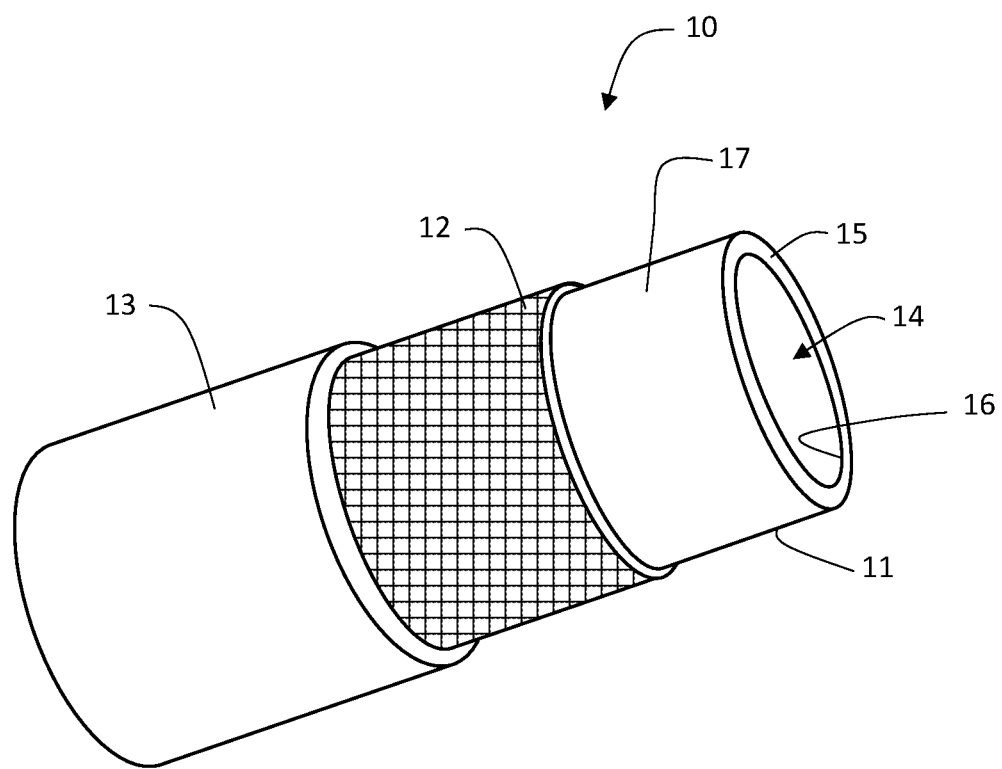
FIG. 1 illustrates an exemplary embodiment of a composite hose of the present disclosure.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Within the meaning of this application, by the term "composite hose" is meant a conduit, tube or pipe, as well as fittings and couplings and parts thereof used to convey a fluid, such as fuel, hydraulic fluid, oil, engine coolant fluid or air. The composite hose usually takes the form of an elongated, cylindrical hollow body. At one or both of its ends, the composite hose optionally has hose couplings or fittings, by which the composite hose can be connected to e.g., another hose, tube or pipe or other pipe units, such as a fixed pipe system or other parts of a pipe assembly.

In a preferred embodiment of the present disclosure, the composite hose of the present disclosure comprises several plies or layers ethylene-propylene copolymer rubber (EPR), ethylene-propylene-diene terpolymer rubber (EPDM), a silicone-modified polyolefin, and a silane-grafted polyolefin material arranged one on top of another e.g., in the form of several film plies ("sandwich construction"). A reinforcement layer of textile comprising of knitted, braided or spiral fabric is introduced between the innermost and outermost layers of the composite hose to provide good pressure and abrasion resistance.

The embodiment described herein comprises a single-frequency radio frequency identification (RFID)) module that is compact in size, can be portable and used in multiple applications. The single-frequency RFID module described herein can include, a passive RFID tag and a passive sensor connected to an antenna subsystem. Additionally, in the embodiment described herein passive RFID tags do not have a power supply, such as for example a battery and require an electromagnetic field from an external source, such as for example, an RFID reader to harvest radio frequency (RF) energy to power the tag. Similarly, the included passive sensor is not powered by a power supply and relies on the power provided to the RFID tag from the RFID reader to power the sensor.

As used herein, the energy harvesting, refers to a process of extracting and capturing electrical energy from an external source. In this embodiment, energy harvesting specifically refers to electromagnetic RF energy harvesting, where an RF electromagnetic field is produced by a transmitter and captured by a tuned coil or electric field within a receiver from an antenna subsystem tuned to the frequency of the RF signal.

The RFID module can be configured to operate at multiple operating frequencies in order to be used in a wider range of applications. For example, the RFID tag can be arranged to use an HF (high frequency) e.g., 13.56 MHz or UHF (ultra-high frequency) e.g., 915 MHz radio transmissions. UHF radio transmission can typically provide for greater read distance than a HF RFID transmission. Meanwhile, HF RFID radio transmission tend to exhibit greater field penetration than the UHF RFID transmissions.

Turning now to FIG. 1 an exemplary embodiment of a composite hose 10 is illustrated. The composite hose 10 composition may include one or more heat-resistant polymers. Non-limiting examples of heat-resistant polymers include ethylene-propylene rubber (EPR) and ethylene propylene diene rubber (EPDM). The hose includes a tube 11, a reinforcement layer 12, and a cover layer 13. Optionally, an overcoat layer (not shown) can be applied over the cover layer 13. The cover layer 13 play include a silane-grafted polyolefin and optionally can be formed from a composition containing fibers, polyamide powder, and/or an ultra-high molecular weight polyethylene powder.

The reinforcement layer 12 may be comprised of a textile yarn for achieving good pressure resistance (e.g., 3 bars at 150° C.). The reinforcement yarn may include knitting, braided fabric, or spiral fabric. The knitting may include lock stitches and/or plain stitches. The textile of the reinforcement layer 12 may include an aramid such as KEVLAR™ or TWARON™, a polyamide, a polyester, RAYON™, NOMEX™, or TECHNORA™. In some embodiments, the yarn is replaced by short fibers mixed with a silane-grafted polyolefin composition and it will be appreciated that other suitable reinforcement may be used without departing from the scope and intent of the present disclosure.

The tube 11 includes a passage 14 surrounded by a cylindrical wall 15. Wall 15 includes an inner surface 16 and an outer surface 17. Tube 11 and/or the cover layer 13 is manufactured from an EPR, EPDM rubber or a silane-grafted polyolefin. Optionally, the cover layer 13 is formed from the composition containing the ultra-high molecular weight polyethylene powder, polyamide powder, and/or the fibers. The cover layer 13 may also include a silicone-modified polyolefin, an EPR, an EPM and/or EPDM. The silane-grafted polyolefin may be cross-linked upon exposure to moisture and/or heat to form an elastomeric material. The cross-linked polyolefin can be used in place of existing EPDM rubber formulations that are used in the manufacture of automotive hoses. The cover layer 13 may have a thickness of from about 0.5 mm to about 6.0 mm, including from about 1.5 mm to about 4.5 mm and from about 2 mm to about 3 mm.

The composite hose 10 just described can be manufactured in short sections that connect the passages 14 of each short section using appropriate fittings between the sections. Or as a composite hose having an extended length that connects components to other components in vehicular systems, such as for example, a brake master cylinder to a brake caliper assembly.

Figure 2:
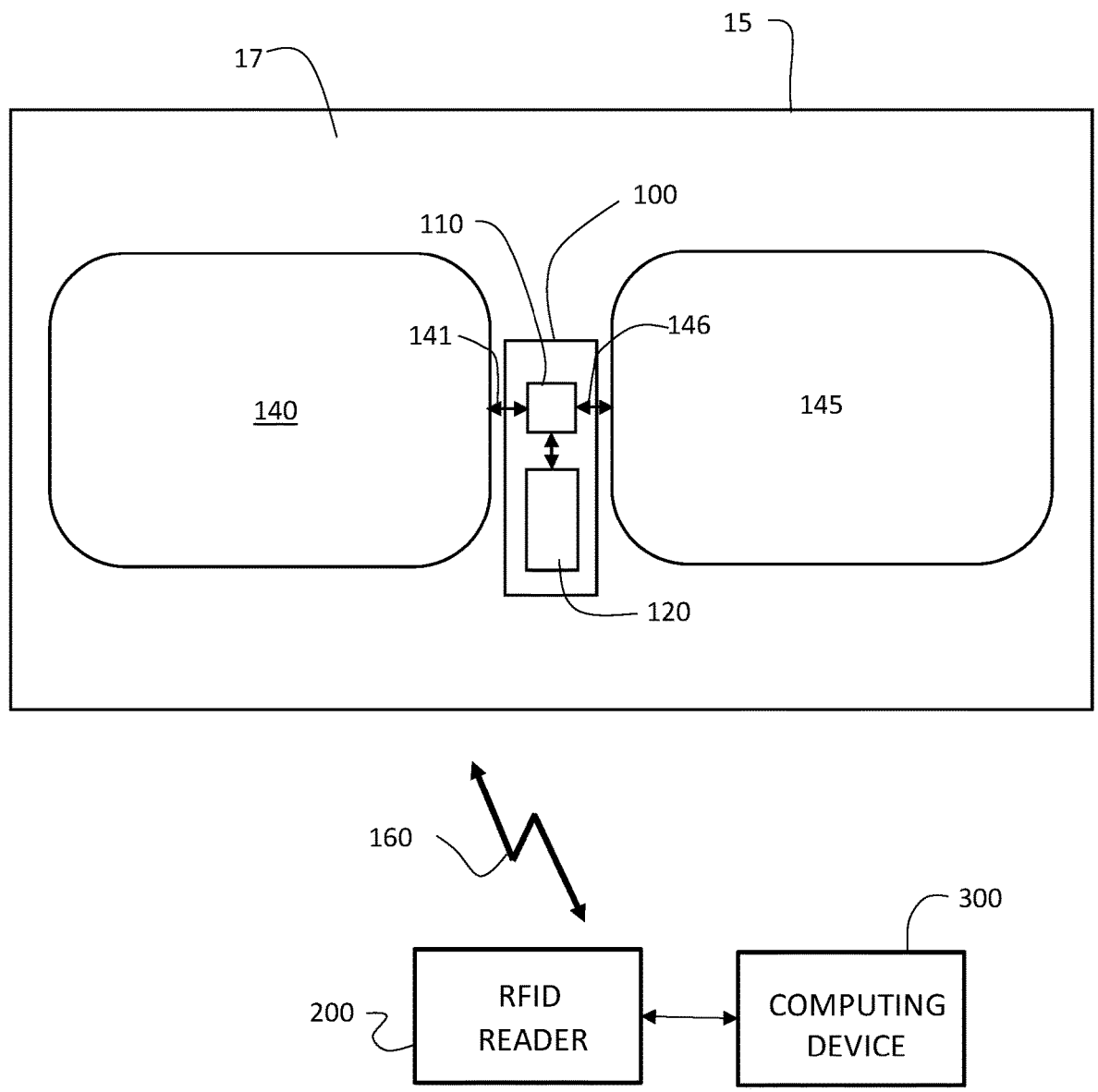
FIG. 2 illustrates a schematic diagram of the exemplary RFID module, and antenna subsystem according to the present disclosure.

Turning to FIG. 2 a schematic diagram of an exemplary RFID module and antenna subsystem of the present embodiment is illustrated. The RFID module 100 includes a passive RFID tag 110 and a sensor 120. The RFD tag 100 is connected to an antenna subsystem comprising a pair of antennas 140 and 145. Antenna 140 is connected to the RFID tag 110 via a conductor 141 and antenna 145 is connected to the RFID tag 110 via a conductor 146. As was explained earlier the antenna subsystem can be tuned to operate in either an HF radio frequency, for example 13.56 MHz or a UHF radio frequency, for example 915 MHz. The RFID module 100 containing the RFID tag 110 and sensor 120, can be assembled together as for example an integrated circuit (IC).

The sensor 120 of the RFID module may be configured to be any resistive type of sensor or transducer, including bridge devices, devices that generate voltage, such as piezoelectric sensors, thermocouples, thermoelectric generators and the like, capacitive sensors, pressure sensors, liquid leak sensors, and other such sensor or transducer types. Within the meaning of this application the sensor 120 is selected to sense a physical property from the group consisting of the temperature of the composite hose 10, e.g. the temperature of tube 11 as influenced by the temperature of the fluid flowing in passage 14, the positive or negative pressure within passage 14, for example the strain acting on wall 15 of tube 11 and the integrity of the outer surface 17 of wall 15 due to leakage of fluid from tube 11 due to a break in the tube caused by wear of the material forming wall 15.

In this way, one or more physical properties of a fluid flowing in passage 14 of the composite loser 10 can be detected. Because of the low power available from the RF source in passive RFID tags, it is most preferred to use high impedance sensors in order to reduce power consumption.

Figure 3:
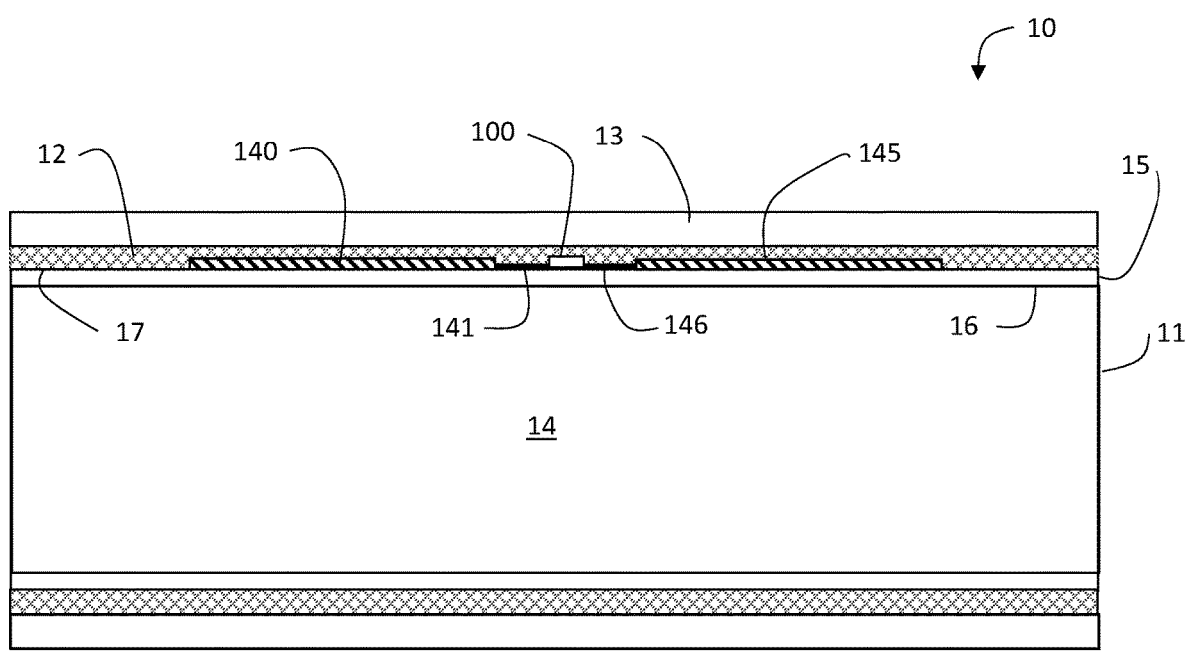
FIG. 3 illustrates a side sectional view of the exemplary composite hose of FIG. 1 having the RFID module and antenna subsystem mounted within the composite hose in according to the present disclosure.

As can be seen in FIG. 3, the RFID module 100 along with antennas 140, 145 are mounted to the outer surface 17 of wall 15 using any suitable technique for attaching the RFID module 100 and antennas 140, 145 to the surface 17. This may include using a suitable adhesive to attach the RFID module 100 and antennas 140, 145 to the outer surface 17. The adhesive would be applied to the outer surface 17 where the RFID module 100 and antennas 140, 145 are to be mounted. Suitable adhesives include acrylic-based thermoset adhesives, such as DuPont PYRALUX LF or PYRALUX FR sheet adhesive or bond ply adhesive. Other adhesives for attaching the flexible substrate and sensor to the conduit may comprise flexible rubber adhesive with particle fillers, nano-fillers, or other fillers to further increase the modulus of elasticity of the adhesive.

Still another method of attaching the RFID module 100 and antennas 140, 145 would be to simply position the RFID module and antennas on outer surface 17 and wind the reinforcement layer 12 over the RFID module 110 and the antennas 140, 145 during manufacture of the composite hose 10. Reinforcement layer 12 of the composite hose 10 would retain and hold the RFID module 110 and the antennas 140, 145 in position.

The antennas 140, 145 can be connected by crimping through layers (e.g., aluminum) of the antennas 140, 145 to form conductors 141, 146 to electrically connect the antenna subsystem to the RFID tag 110. Alternatively, conductor 141, 146 can be formed using wire conductors or other forms of conductive traces.

In another exemplary embodiment, both antennas 140, 145 can be electronically connected to the RED tag 110 by depositing (e.g., printing) dielectric and conductive inks on outer surface 17 of tube 11. For example, the flat planar shapes that form antennas 140, 145 as well as conductors 141 and 146 can be constructed using conductive inks printed directly on outer surface 17. Antennas 140, 145 can be connected to the RFID tag 110 using dielectric inks deposited over the antennas to create a conductive trace that connects each antenna 140, 145 to the RFID tag 110. It will be well understood by those skilled in the art that other forms of antennas may be formed and used with RFID tag 110, such as for example coils, longitudinally oriented wire conductors that run along the axial length of the tube 11 as well as spiral wound conductors that coil around the tube 11.

As shown in FIG. 3 sensor 120 of RFID module 100 is positioned to provide sensor readings representing one or more physical properties of the fluid flowing in passage 14, such as a temperature, a positive or negative pressure or strain, or fluid leaks that are leaked onto outer surface 17 through wall 15. Additionally, due to the RFID module's location within the composite hose 10 between tube 11 and reinforcement layer 12 and cover layer 13 the RFID module and antenna subsystem is protected against the ingress of dust particles, air, liquids and/or corrosive chemicals.

With renewed reference to FIG. 2 an exemplary method for operating the RFID module 100 will now be explained. The RFID module 100 communicates with an actively powered RFID reader 200 via a wireless RFID protocol 160 using wireless frequency transmissions. The RFID module 100 is designed to receive and transmit RFID protocol transmissions using either a UHF frequency, for example 915 MHz or an HF frequency, for example 13.56 MHz using antennas 140, 145. Similarly, the RFID reader 200 can transmit and receive RFID protocol transmissions at a UHF frequency of 915 MHz, or at an HF frequency of 13.56 MHz. The RFID tag 110 works in cooperation with sensor 120 to send sensor data and stored RFID ID information, to the RFID reader 200. The stored RFID tag information may comprise a numerical or alphanumerical ID for identifying the RFID tag 110.

The RFID reader 200 transmits interrogation signals via the wireless RFID protocol 160 using either the UHF or HF frequency. When the RFID reader 200 is placed in proximity to antennas 140, 145, the RF interrogation signals are received by the antennas 140, 145 and passed to the RFID tag 110. The RF energy from the interrogation signals is harvested and converted to electrical energy and used by the RFID tag 110 to power-up the RFID tag 110. Upon power-up, the RFID tag 110 sends an authentication response back to the RFID reader 200 via antennas 140, 145 using the wireless RFID protocol 160. Upon receiving the authentication response, the RFID reader 200 switches to a reception mode to receive data from the RFID tag 110.

The RFID tag 110 uses the converted RF energy to power its components including the sensor 120. Sensor 120 uses the converted power from the RFID tag 110 to obtain measurement data for a physical property of the composite hose 10. The measurement data is transferred to the RFID tag 110 which is transmitted to the RFID reader 200 via antennas 140, 145.

The RF ID tag 110 also sends RFID ID information along with the sensor 120 measurement data. The RFID ID information can include a distinctive numeric or alphanumeric; identification of the RFID tag 110, a location for the RFID tag 110 within a vehicle piping system, or other identifying information concerning the composite hose 10 within a vehicle installation, such as, in what component system the composite hose is installed in, for example a radiator cooling circuit.

The RFID reader 200 can temporarily store the received measurement data from the sensor 120 for further processing or transfer the measurement data directly to a computing device 300. The computing device 300 can use the measurement data to calculate values of the detected physical properties of the fluid, such as for example, a temperature or pressure. The computing device 300 can also be used to perform post-processing evaluation on the received measurement data or store the unprocessed data for further analysis. Measurement and RFID ID information is continuously transmitted to the RFID reader 200 as long the RFID reader sends its interrogation signals to the RFID tag 110. Removing the RFID reader 200 from the vicinity of antennas 140, 145 powers-down the RFID tags 110 which ceases transmissions.

The RFID reader 200 can be intermittently or continuously connected to one or more computing devices 300 such as data terminal or a data center. According to one exemplary embodiment, computing device 300 may not be tied to a particular device or processor and may be implemented by a cloud computing service or other distributed processing service. The connection between the RFID reader 200 and the computing device 300 may be a wireless connection such as a WiFi or a BLUETOOTH communication protocol, or a hard-wired connection implemented according to a known IP protocol, for example via Ethernet or coaxial cable.

In another exemplary embodiment, the RFID reader 200 may perform some of the functions described herein as belonging to computing device 300, and vice versa. In fact, the RFID reader 200 and the computing device 300 may in some cases be implemented as a single unit or may be implemented as more than two units as described above. In this case, the functionality associated with either or both of these devices is distributed across two or more devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for sensing a physical property of a fluid contained in a composite hose, the composite hose comprising a first layer of composite material formed as a tube having a cylindrical wall with inner and outer surfaces, the inner surface defining a passage containing the fluid, the system comprising:
   a radio frequency identification (RFID) reader arranged to transmit radio frequency signals;
   at least a second layer of composite material applied over the tube outer surface;
   an RFID tag located on the tube outer surface under the second layer, the RFID tag receiving the radio frequency signals and converting the radio frequency to electrical energy to power the RFID tag;
   a sensor electrically connected to the RFID tag, the sensor receiving the electrical energy from the RFID tag to operate the sensor and obtain measurement data of at least one physical property of the fluid in the passage; and
   the sensor transmitting the measurement data to the RFID tag, wherein the measurement data is transmitted from the RFID tag to the RFID reader using the radio frequency.

2. The system of claim 1, wherein the system further includes at least one antenna electrically connected to the RFID tag.

3. The system of claim 1, wherein the at least one radio frequency is an ultra-high frequency (UHF) radio frequency.

4. The system of claim 1, wherein the at least one radio frequency is a high frequency (HF) radio frequency.

5. The system of claim 4, wherein the RFID tag and the sensor are assembled together as an integrated circuit RFID module.

6. The system of claim 5, wherein the
   RFID module and the at least one antenna are mounted on the tube outer surface.

7. The system of claim 6, wherein the
   the at least second layer is a reinforcement layer applied over the RFID module and antenna; and
   at least one protective layer is applied over the reinforcement layer.

8. The system of claim 5, wherein the RFID tag further includes stored identification data, identifying the RFID module, the identification data transmitted to the RFID reader along with the measurement data using the radio frequency.

9. The system of claim 6, wherein the sensor is arranged to sense a physical property of the fluid contained in the passage and acting on the inner surface of the tube wall consisting of at least one of:
   the temperature of the fluid;
   the positive or negative pressure acting on the tube wall; and
   the integrity of the tube wall due to a break in the tube wall.

10. A method for sensing a physical property of a fluid contained in a composite hose, the composite hose comprising a first layer of composite material formed as a tube having a cylindrical wall with inner and outer surfaces, the inner surface defining a passage containing the fluid, the method comprising:
    placing at least a second layer of composite material over the tube outer surface;
    installing an RFID tag on the tube outer surface under the second layer;

transmitting signals in a radio frequency using a radio-frequency identification (RFID) protocol;
receiving by the RFID tag the radio frequency and the RFID protocol;
converting by the RFID tag the radio frequency to electrical energy to power the RFID tag and a sensor;
operating the sensor using the electrical energy to obtain measurement data of at least one physical property of the fluid;
transmitting the measurement data to the RFID tag, and
transmitting the measurement data from by the RFID tag using the RFID protocol and the radio frequency.

11. The method of claim 10, wherein method further includes at least one antenna electrically connected to the RFID tag.

12. The method of claim 10, wherein the transmission of the radio frequency comprises a UHF radio frequency.

13. The method of claim 10, wherein the transmission of the radio frequency comprises an HF radio frequency.

14. The method of claim 10, wherein the transmission of the measurement data includes RFID identification data stored in the RFID tag.

15. The method of claim 14, wherein the stored RFID identification data comprises at least one of:
identifying information of the RFID tag;
a location of the RFID tag; and
identifying information of the composite hose where the RFID tag is installed.

16. The method of claim 10, wherein the transmission of electromagnetic signals in at least one radio frequency comprises:
using a remotely located RFID reader to transmit the RFID protocol to the RFID tag.

17. The method of claim 16, wherein the RFID reader transmits RF interrogation signals to the RFID tag using the RFID protocol and the radio frequency.

18. The method of claim 17, wherein the RFID reader receives the measurement data from by the RFID tag using the RFID protocol and the radio frequency and the RFID reader transmits the measurement data to a computing device communicatively connected to the RFID reader, the computing device performing at least one of:
calculating values for the measurement data received from the RFID tag for a physical property of the fluid in the conduit;
performing post-processing evaluation on the measurement data; and
storing unprocessed measurement data for further analysis.

19. The method of claim 11, wherein the
RFID tag, the sensor and the at least one antenna are placed on the outer surface of the tube wall.

20. The method of claim 19, wherein the at least one second layer is a reinforcement layer, the method further including:
applying the reinforcement layer over the tube outer surface and the RFID tag, the sensor and the at least one antenna; and
applying at least one protective layer over the reinforcement layer.

* * * * *